US006732696B2

(12) United States Patent
Huesges

(10) Patent No.: US 6,732,696 B2
(45) Date of Patent: May 11, 2004

(54) AIR INTAKE DUCT SYSTEM FOR INTERNAL COMBUSTION ENGINES

(75) Inventor: Hans-Juergen Huesges, Willich (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/194,830

(22) Filed: Jul. 12, 2002

(65) Prior Publication Data
US 2003/0019458 A1 Jan. 30, 2003

(30) Foreign Application Priority Data
Jul. 28, 2001 (DE) .......................... 101 37 077

(51) Int. Cl.[7] ............................. F02M 35/10
(52) U.S. Cl. ................................. 123/184.55
(58) Field of Search .................... 123/184.55

(56) References Cited

FOREIGN PATENT DOCUMENTS

DE 19756332A1 6/1999

Primary Examiner—Noah P. Kamen
(74) Attorney, Agent, or Firm—Ohlandt, Greeley, Ruggiero & Perle

(57) ABSTRACT

An air intake duct system for internal combustion engines, and in particular for V-engines, comprises a plurality of air intake ducts (10, 12). Each air in-take duct is formed by two duct portions (18), and (20) and (22), respectively. The second duct portions (20, 22) are arranged to swivel about a swivelling axis (34) and (36), respectively, for varying the length of the air intake duct. According to the invention the two swivelling axes (34, 36) are supported in a common bearing part (44) which comprises two swivelling axis bearings each provided for one of the two swivelling axes (34, 36).

7 Claims, 2 Drawing Sheets

AIR INTAKE DUCT SYSTEM FOR INTERNAL COMBUSTION ENGINES

BACKGROUND OF THE INVENTION

The invention relates to an air intake duct system for internal combustion engines, and in particular for V-engines.

From DE 197 56 332 an air intake duct system is known, wherein the length of a plurality of air intake ducts, each connectable with a cylinder of an internal combustion engine, is continuously variable. For this purpose, the helical intake ducts are arranged side by side. Each helical air intake duct comprises an inlet opening connected with a central inner area of the air intake system, wherein the air enters the helical duct through said inlet opening and, after having passed through the helical duct, is directed to the corresponding cylinder. Inside the central area a tubular duct portion is arranged which defines the inner wall of the helical duct and comprises the air inlet opening. The tubular duct portion is arranged to swivel such that the position of the air inlet opening can be varied. By swivelling the tubular duct portion, the length of the air intake duct, i. e. the distance between the air inlet opening and the air outlet opening to be travelled by the air, is thus continuously variable.

The individual duct portions forming the intake ducts are arranged adjacent to each other or are stacked one upon the other, wherein the air intake ducts are alternately connected with one or the other row of cylinders of the V-engine. For swivelling the inner duct portions said duct portions are connected with a swivelling axis. The air intake ducts connected with a respective side of the V-engine have the same length and are thus jointly operated via a swivelling axis. Therefore the air intake duct system comprises two swivelling axes which are respectively connected with the swivel-mounted duct portions for one or the other row of cylinders of the V-engine. To realize air intake ducts of essentially the same lengths for the individual cylinders, the individual air intake ducts of one or the other row of cylinders are alternately arranged in the air intake duct system. The two swivelling axes are thus connected only with every second swivel-mounted duct portion of the air intake system and only pass through the respective other duct portion.

The swivelling axes are e. g. supported in individual sliding bearing sleeves. The sliding bearing sleeves, which are e. g. made of hardened steel, are arranged in a housing of the air intake duct system or in the stationary duct portions. Provision of individual bearing sleeves for the two swivelling axes has the disadvantage that due to a minimum thickness of the bearing sleeves and the resultant minimum distance of the swivelling axes to each other, the necessary space requirement is relatively large.

Another possibility is to directly support the swivelling axes, which are normally made of metal, in the plastic duct portions. This however results in relatively heavy wear such that the required average service life cannot be reliably attained.

SUMMARY OF THE INVENTION

It is an object of the present invention to reduce the space required for the air intake duct system.

According to the invention, the space required for the air intake duct system can be reduced by reducing the distance of the two swivelling axes to each other. Since supporting in a plastic material is disadvantageous because of the wear, the present invention provides a common integral bearing part having two swivelling axis bearings, i. e. one for each of the two swivelling axes. Preferably, two sliding bearing sleeves are provided which overlap each other such that the bearing part has the form of an "8". A partition wall arranged between the two bearing sleeves serves as a sleeve wall for the two bearing sleeves. In contrast to identical bearing sleeves arranged side by side, the two cylindrical sleeves can be arranged considerably more closely to each other in the openings of the bearing part according to the invention such that the accommodation space required is reduced.

BRIEF DESCRIPTION OF THE DRAWINGS

Hereunder an embodiment of the present invention is explained in detail with reference to the drawings in which.

DESCRIPTION OF THE PREFERRED EMBODIMENT

Figure 1:
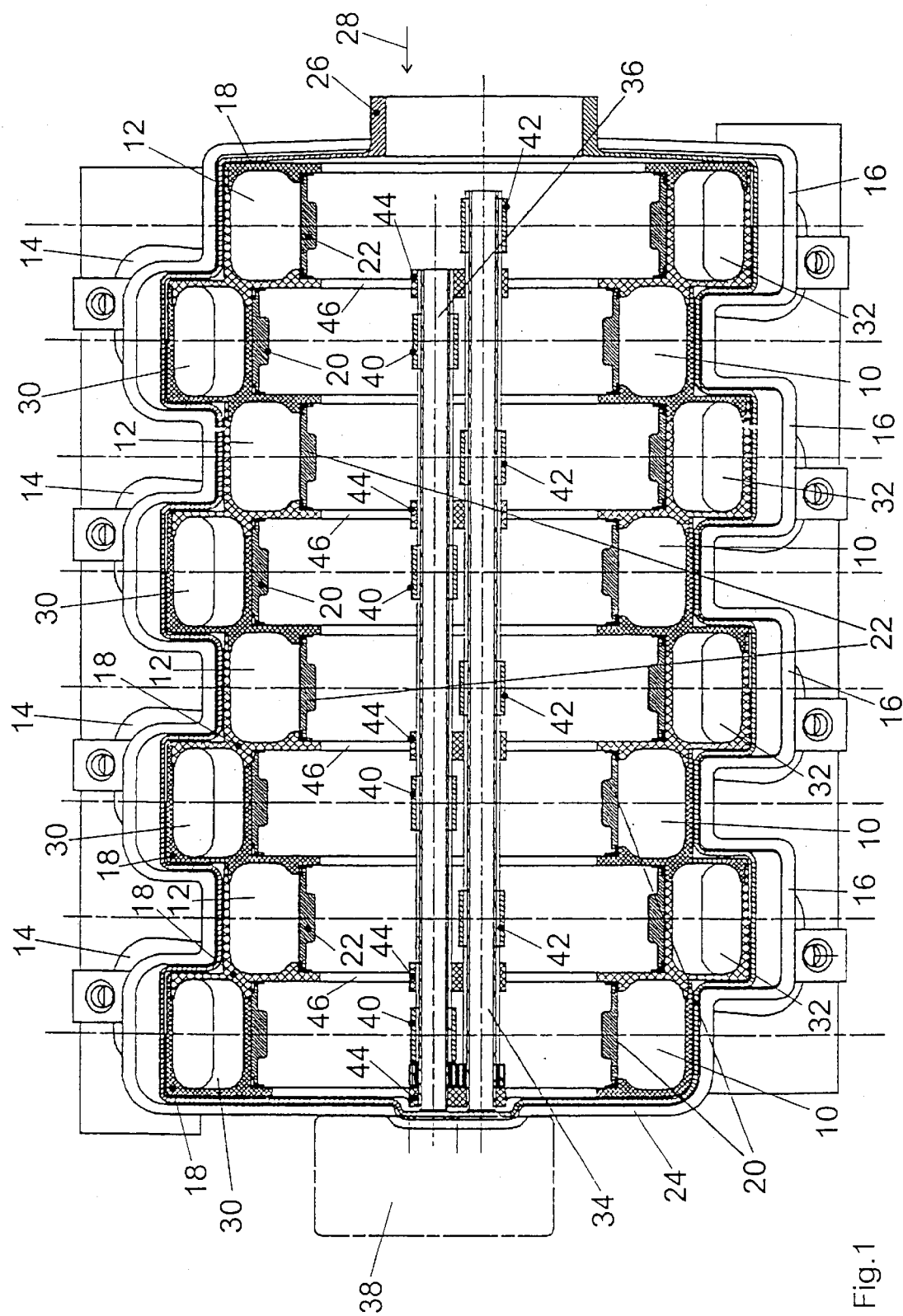
FIG. 1 shows a schematic sectional view of an air intake duct system for an 8-cylinder V-engine.

The air intake duct system comprises eight helical air intake ducts 10, 12. The intake ducts 10 are connected via projections 14 with one side of the V-engine, and the intake ducts 12 are connected via projections 16 with the other side of the V-engine. The individual intake ducts are formed by a first duct portion 18, which is stationary in the embodiment shown, and a second duct portion 20, 22 which is arranged to swivel. With the exception of the two duct portions shown in the left and right margins of the figure, all first duct portions 18 are of identical configuration and, as shown in FIG. 1, are arranged side by side or stacked one upon the other. The first duct portions 18 are arranged in a housing 24 made up of two housing halves. The swivel-mounted second duct portions 20 and 22 are also identical.

The air to be supplied to the individual intake ducts 10, 12 is guided, in a direction shown by an arrow 28, via an intake connection 26 into the inner area of the air intake system. The inner area is formed by the swivel-mounted duct portions 20, 22 which are arranged side by side and are of essentially circular cylindrical configuration. Depending on the embodiment, additional intake openings may be connected with the individual air take ducts 10, 12 such that air enters the air intake ducts 10, 12 both via the central area of the air intake duct system and the additional supply ducts. From the central area of the air intake system the air flows through air inlet openings provided in the swivel-mounted duct portions 20, 22 into the corresponding air intake ducts 10, 12. Then the air leaves the air intake ducts 10, 12 through air outlet openings 30 and 32, respectively, and is supplied via ducts (not shown) to the corresponding cylinders.

To vary the length of the air intake ducts 10, 12 the swivel-mounted duct portions 20, 22 are permanently connected with swivelling axes 34, 36. By swivelling the swivelling axes 34, 36 with the aid of an actuator 38 the position of the air inlet openings of the swivel-mounted duct portions 20, 22 is changed such that the air from the central area enters the helical air intake ducts 10, 12 at a different location, thus travelling a shorter or a longer distance.

The second duct portions 20 are connected via webs with holding fixtures 40 and form an adjusting element. The holding fixtures 40 are connected via a pipe member (square) with the swivelling axis 36. The holding fixtures 40 and the swivelling axis 36 are additionally connected with each other by leaf springs. The holding fixtures 40 are connected via webs with the second duct portion 20. Accordingly, the duct portions 22 are connected via webs and holding fixtures 42 with the swivelling axis 34. The duct portions 20 and 22, respectively, are thus always jointly swivelled such that the air intake ducts 10 and 12, respectively, on each side of the V-engine are of identical length.

According to the invention, support of the two swivelling axes 34, 36 is effected by a bearing part 44 in which the two axes are jointly supported. The bearing parts 44 are arranged in radial walls 46 of the stationary first duct portions 18. The number of bearings can vary depending on the required accuracy and the material used. The bearing parts 44 are made of sintered steel, nodular graphite iron or are configured as forgings. Preferably, the bearing parts 44 are fastened by enmolding to the walls 46 of the duct portions 18.

Figure 2:
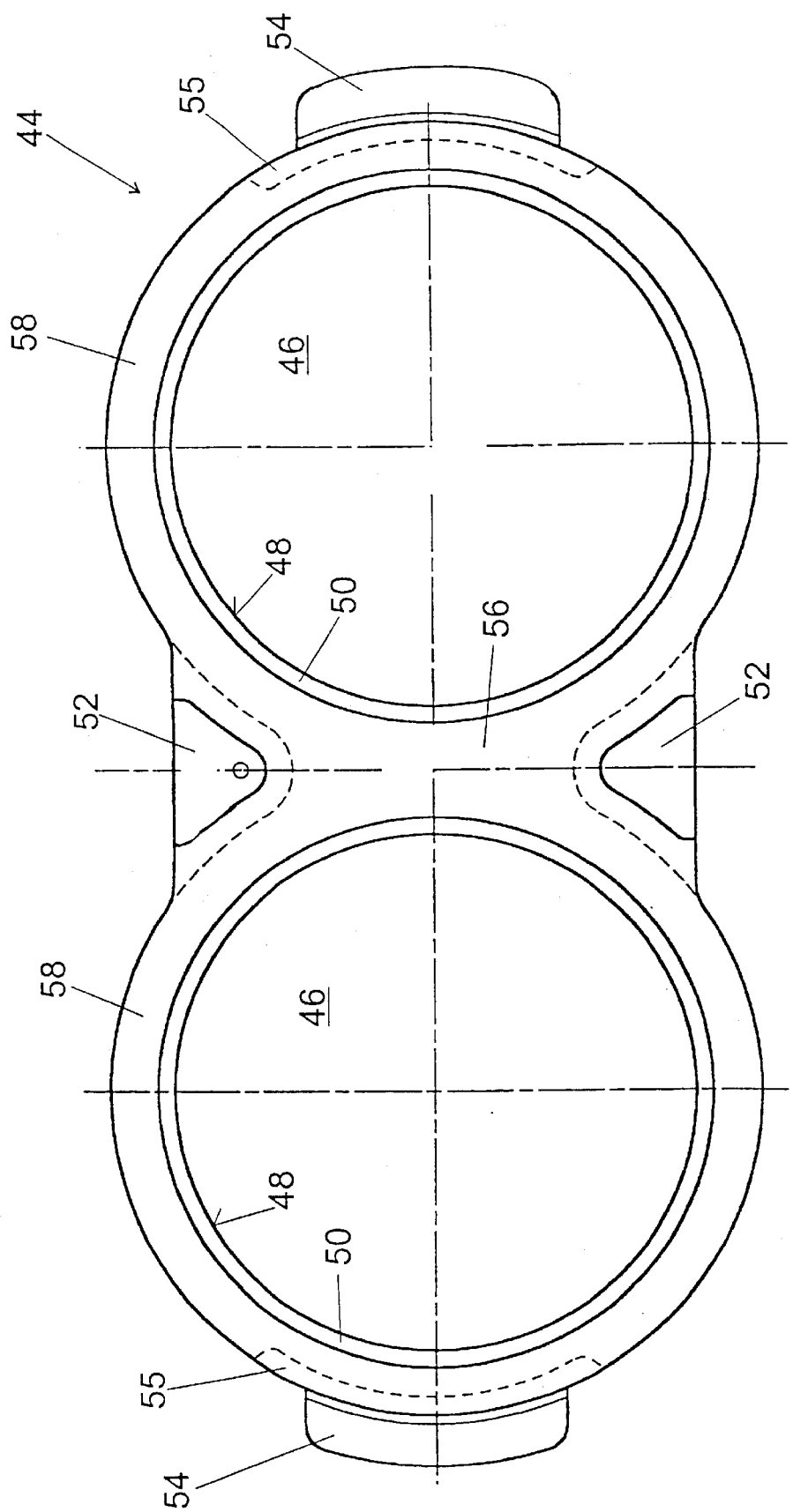
FIG. 2 shows a schematic top view of the bearing part according to the invention.

The bearing part 44 (FIG. 2) comprises two cylindrical openings 46 such that the inner walls 48 form two cylindrical bearing sleeves for accommodating the two swivelling axes 34, 36. To facilitate insertion of the swivelling axes 34, 36 into the openings 46, said openings 46 are provided with a chamfer 50. For reinforcing the two sleeves which are connected such that they form an "8", a web 52 is provided in each constricted area. Further, two projections 54 are provided on the outer walls of the sleeves, which projections 54 do not extend over the overall height of the bearing part 44. Both the webs 52 and the projections 54 are covered with plastic material when the bearing part 44 is enmolded. Instead of or in addition to the projections 54 undercuts or slots 55 may be provided. They ensure that the bearing parts 44 are securely retained in the walls 46 of the stationary duct portions 18. Provision of a common bearing part 44 according to the invention for the two swivelling axes further offers the advantage that the distance of the two swivelling axes to each other is clearly defined.

The bearing part 44 being essentially configured as an "8" comprises a common sleeve wall 56. The common sleeve wall 56 is arranged between the two bearing sleeves 48 and serves as a wall for both bearing sleeves 48. According to the invention, the thickness of the common sleeve wall 56 can be smaller than twice the thickness of the individual or external sleeve walls 58. Preferably, the thickness of the common sleeve wall 56 is smaller than 1.5 times the individual sleeve walls 58. Particularly preferred is a thickness of the common sleeve wall 56 which approximately corresponds to the thickness of the individual sleeve wall 58. This allows the distance between the two swivelling axes 34, 36 supported in the bearing sleeves 48 to be minimized.

Although a preferred embodiment of the invention has been specifically illustrated and described herein, it is to be understood that minor variations may be made in the system without departing from the spirit and scope of the invention, as defined in the appended claims.

What is claimed is:

1. Air intake duct system for internal combustion engines, comprising:
   a plurality of air intake ducts each formed by at least a first and a second duct portion,
   an air inlet opening provided in one of the duct portions and an air outlet opening provided in the other duct portion, wherein at least one of the duct portions is arranged to swivel to vary the length of the respective air intake duct,
   two swivelling axes each connected wit at least one swivel-mounted duct portion, and swivelling axis bearings for accommodating the swivelling axes,
   wherein an integral bearing part comprising two swivelling axis bearings each accommodating one of the two swivelling axes is provided.

2. Air intake duct system according to claim 1, wherein the swivelling axis bearings are formed by two bearing sleeves.

3. Air intake duct system according to claim 2, wherein the bearing part comprising a common sleeve wall arranged between the two bearing sleeves.

4. Air intake duct system according to claim 1, wherein the bearing part has a cross-section in the form of an "8".

5. Air intake duct system according to claim 1, wherein the bearing part is arranged in the stationary duct portion.

6. Air intake duct system according to claim 1, wherein the bearing part is connected with the stationary duct portion by being at least partial covered with plastic material.

7. Air intake duct system for internal combustion engines, comprising:
   a plurality of air intake ducts each formed by at least a first and a second duct portion,
   an air inlet opening provided in one of the duct portions and an air outlet opening provided in the other duct portion, wherein at least one of the duct portions is arranged to swivel to vary the length of the respective air intake duct,
   two swivelling axes each connected with at least one swivel-mounted duct portion, and
   swivelling axis bearings for accommodating the swivelling axes.
   wherein an integral bearing part comprising two swivelling axis bearings each accommodating one of the two swivelling axes is provided, the swivelling axis bearings being formed by two bearing sleeves and the bearing part comprises a common sleeve wall arranged between the two bearing sleeves, wherein the common sleeve wall has essentially the same thickness as the individual sleeve walls.

* * * * *